US010229328B2

United States Patent
Nikolova et al.

(10) Patent No.: US 10,229,328 B2
(45) Date of Patent: Mar. 12, 2019

(54) ON-BODY CONCEALED WEAPON DETECTION SYSTEM

(71) Applicant: McMaster University, Hamilton (CA)

(72) Inventors: Natalia K. Nikolova, Ancaster (CA); Justin J. McCombe, Guelph (CA)

(73) Assignee: MCMASTER UNIVERSITY, Hamilton (CA)

( * ) Notice: Subject to any disclaimer, the term of this patent is extended or adjusted under 35 U.S.C. 154(b) by 599 days.

(21) Appl. No.: 14/751,796

(22) Filed: Jun. 26, 2015

(65) Prior Publication Data

US 2015/0379356 A1 Dec. 31, 2015

Related U.S. Application Data

(60) Provisional application No. 62/017,410, filed on Jun. 26, 2014.

(51) Int. Cl.
| | |
|---|---|
| *G01S 7/02* | (2006.01) |
| *G01S 7/28* | (2006.01) |
| *G01V 3/12* | (2006.01) |
| *G06K 9/00* | (2006.01) |
| *G01S 13/88* | (2006.01) |
| *G01S 7/292* | (2006.01) |

(52) U.S. Cl.
CPC .......... *G06K 9/00771* (2013.01); *G01S 7/024* (2013.01); *G01S 7/2806* (2013.01); *G01S 7/292* (2013.01); *G01S 13/887* (2013.01); *G01V 3/12* (2013.01); *G06K 2209/09* (2013.01)

(58) Field of Classification Search
CPC ....................... G06K 9/00771; G06K 2209/09; G01S 7/024; G01S 7/2806; G01S 7/292; G01S 13/887; G01V 3/12

USPC .......................................................... 342/22
See application file for complete search history.

(56) References Cited

U.S. PATENT DOCUMENTS

| | | | |
|---|---|---|---|
| 5,367,552 A | 11/1994 | Peschmann | |
| 5,552,705 A | 9/1996 | Keller | |
| 6,342,696 B1 * | 1/2002 | Chadwick | ............... G01S 7/025 250/225 |

(Continued)

OTHER PUBLICATIONS

McCombe et al., "Clutter Removal in the Automatic Detection of Concealed Weapons with Late Time Responses", The 10th European Radar Conference (EuRAD 2013), Oct. 2013, Nuremberg, Germany.

(Continued)

*Primary Examiner* — Frank J McGue
(74) *Attorney, Agent, or Firm* — Bereskin & Parr LLP/S.E.N.C.R.L., S.R.L.

(57) ABSTRACT

A system and method for detecting weapons. A radiofrequency transmitter transmits an RF signal stream into a region of interest. An RF receiver receives a scattered signal stream from the region of interest. The scattered signal stream is generated in the region of interest from the radiofrequency signal stream when a target is at least partially within the region of interest. A plurality of resonant signal components are identified from the scattered signal stream. Preprocessed resonant signal components are generated by removing environmental signal components. A target assessment is determined from the preprocessed resonant signal components using a trained statistical model. A target response is triggered if the target assessment indicates that a weapon is detected on the target.

18 Claims, 8 Drawing Sheets

(56) References Cited

U.S. PATENT DOCUMENTS

| | | | |
|---|---|---|---|
| 6,359,582 B1* | 3/2002 | MacAleese | G01S 7/417 342/192 |
| 6,469,624 B1 | 10/2002 | Whan et al. | |
| 6,501,414 B2 | 12/2002 | Arndt et al. | |
| 6,650,276 B2 | 11/2003 | Lawless | |
| 6,765,527 B2 | 7/2004 | Jablonski et al. | |
| 6,831,590 B1 | 12/2004 | Steinway et al. | |
| 6,876,322 B2 | 4/2005 | Keller | |
| 7,365,672 B2 | 4/2008 | Keller et al. | |
| 7,518,542 B1 | 4/2009 | Steinway et al. | |
| 7,768,444 B1 | 8/2010 | Rourk | |
| 9,182,481 B2* | 11/2015 | Bowring | G01S 7/411 |
| 2002/0008655 A1 | 1/2002 | Haj-Yousef | |
| 2010/0079280 A1* | 4/2010 | Lacaze | G01V 3/08 340/540 |
| 2013/0106643 A1* | 5/2013 | Wahlquist | G01S 13/04 342/27 |

OTHER PUBLICATIONS

Agurto et al., "A Review of Concealed Weapon Detection and Research in Perspective", IEEE International Conference on Networking, Sensing and Control, pp. 443-448, London, UK, Apr. 15-17, 2007.

Akela, "Demonstration of a Concealed Weapons Detection System Using Electromagnetic Resonances", pp. 1-48, Jan. 26, 2001.

Chen et al., "Imaging for Concealed Weapon Detection", IEEE Signal Processing Magazine, pp. 52-61, Mar. 2005.

Gashinova et al., "UWB signature analysis for detection of body-worn weapons", Microwave Integrated System Lab, Electronic, Electrical and Computer Engineering, The University of Birmingham.

Paulter, "Guide to the Technologies of Concealed Weapon and Contraband Imaging and Detection", National Institute of Justice, pp. 1-56, Feb. 2001.

Harmer et al., "Detection of handguns by their complex natural resonant frequencies", IET Microw. Antennas Propag., 2010, vol. 4, Iss. 9, pp. 1182-1190.

Harmer et al., "On Body Concealed Weapon Detection Using a Phased Antenna Array", Progress in Electromagnetics Research, vol. 124, 187-210, 2012.

Hausner et al., "Radar Based Concealed Threat Detector", Electro Science Technologies, Albuquerque, New Mexico.

Hausner et al., "Radar Based Concealed Threat Detector", Electro Science Technologies, pp. 765-768, Albuquerque, New Mexico.

Hunt et al., "Concealed weapons detection using electromagnetic resonances", AKELA, Inc., Part of the SPIE Conference on Enforcement and Security Technologies, Boston, Massachusetts, Nov. 1998, SPIE vol. 3575.

Hunt et al., "A Stepped-Frequency, CW Radar for Concealed Weapon Detection and Through the Wall Surveillance", Sensors, and Command, Control, Communications, and Intelligence (C3I) Technologies for Homeland Defense and Law Enforcement, Proceedings of SPIE Vo. 4708 (2002), pp. 99-105.

Pasqua, Thesis entitled "UWB FMCW Radar for Concealed Weapon Detection: RF front-end development", Feb. 8, 2012.

Shuley et al., "Role of polarisation in automatic target recognition using resonance description", Electronics Letters, vol. 40, No. 4, Feb. 19, 2004.

Vasalos, Thesis entitled "UWB Radar for Concealed Weapon Detection: feasibility study", Sep. 2010.

* cited by examiner

ON-BODY CONCEALED WEAPON DETECTION SYSTEM

CROSS-REFERENCE TO RELATED APPLICATIONS

This application claims the benefit of U.S. Provisional Patent Application No. 62/017,410, filed Jun. 26, 2014. The entire contents of U.S. Provisional Patent Application No. 62/017,410 are hereby incorporated by reference.

FIELD

The various embodiments described herein generally relate to the field of detecting weapons. In particular, the various embodiments described herein relate to the field of remotely detecting weapons on a person's body.

BACKGROUND

A great variety of concealed weapon detection (CWD) systems have been suggested. These systems exploit different physical principles such as 1) electromagnetic-wave radiation in the radio-frequency (RF), microwave and millimeter-wave frequency bands; 2) detection of distortions in a background magnetic field (magnetic systems); 3) magnetic resonance imaging (MRI); 4) inductive magnetic field methods; 5) acoustic and ultrasonic detection; 6) infrared imagers; and 7) X-ray imagers.

Systems employing electromagnetic-wave radiation are often separated into two distinct classes of CWD systems: imagers and detectors. Imagers generate an image of the inspected target and the image is inspected (usually by a human operator) for suspicious objects. Some such imaging systems are already available commercially, e.g. the "whole-body scanners" in operation at many major airports around the world.

Whole-body scanners operate in and around the millimeter-wave frequency ranges (typical operational frequencies lie between 30 GHz and 300 GHz). These systems are often expensive and bulky. These systems also require the full cooperation of the inspected person. The inspected person must not only stay still but also have both arms raised and legs spread apart to allow the millimeter waves to illuminate the whole body surface. Whole-body scanners may also raise privacy concerns because they produce images with fairly detailed outline of the human body.

A number of previous attempts have been made to provide a useful weapons detection system. Examples of previously suggested systems include those described in U.S. Pat. No. 6,342,696 entitled "Object Detection Method and Apparatus Employing Polarized Radiation" to Chadwick; U.S. Pat. No. 6,359,582 (Canadian Pat. No. 2,265,457) entitled "Concealed Weapons Detection System" to MacAleese at al.; U.S. Pat. No. 6,831,590 entitled "Concealed Object Detection" to Steinway et al.; and U.S. Pat. No. 7,518,542 entitled "Handheld Radar Frequency Scanner for Concealed Object Detection" to Steinway et al. These systems all generally require an inspected person's cooperation for effective use. Many such systems, such as microwave detection systems, also tend to have insufficient detection reliability.

SUMMARY OF VARIOUS EMBODIMENTS

In a broad aspect, at least one embodiment described herein provides a method for detecting a weapon. The method can include emitting a radiofrequency signal stream into a region of interest and receiving a scattered signal stream from the region of interest, where the scattered signal stream is generated in the region of interest from the radiofrequency signal stream when a target is at least partially within the region of interest. The method can also include identifying a plurality of resonant signal components from the scattered signal stream and generating a plurality of preprocessed resonant signal components by removing at least one signal component from the plurality of resonant signal components, where the at least one signal component removed corresponds to stored environmental signal components for the region of interest. The method can further include determining a target assessment from the plurality of preprocessed resonant signals using a statistical model that is based on resonant signals associated with the weapon, and triggering a target response if the target assessment indicates the weapon is detected on the target.

In some embodiments, the plurality of resonant signal components can be identified by identifying a late time response portion of the scattered signal stream, and identifying the plurality of resonant signal components from the late time response portion. In some embodiments, the late time response portion can be identified by identifying an initial reflection of the emitted radiofrequency stream in the scattered signal stream, and identifying the late time response portion based on the identified initial reflection.

In some embodiments, the plurality of resonant signal components can be identified by decomposing the scattered signal stream into the plurality of resonant signal components.

In some embodiments, the environmental signal components for the region of interest can be determined by receiving a background scattered signal stream from the region of interest when no targets are within the region of interest, identifying the environmental signal components as a plurality of background resonant signal components from the background scattered signal stream, and storing the environmental signal components. In some embodiments, the stored environmental signal components for the region of interest can be updated intermittently.

In some embodiments, the statistical model can be generated using a training database having a first dataset with a first plurality of resonant signal components associated with the weapon and a second dataset with a second plurality of resonant signal components associated with a generic target when the weapon is not present on the generic target. In some embodiments, the method can further include updating the second dataset based on the plurality of preprocessed resonant signals components if the weapon is not detected on the target.

In some embodiments, the emitted radiofrequency signal stream can be polarized to about a first orientation, and the scattered signal stream can be received at about the first orientation and at about a second orientation, where the second orientation is substantially orthogonal to the first orientation. In some embodiments, the emitted radiofrequency signal stream can be sequentially polarized to about the first orientation and to about the second orientation.

In some embodiments, the emitted radiofrequency signal stream may have a frequency range of between about 0.5 GHz and about 5 GHz.

In another broad aspect, at least one embodiment described herein provides a system for detecting a weapon. The system can include a radiofrequency transmitter having at least one transmission antenna, a radiofrequency receiver having at least one reception antenna, a data storage unit storing environmental signal components for the region of interest and a statistical model based on resonant signals associated with the weapon, and a controller coupled to the radiofrequency transmitter, the radiofrequency receiver, and the data storage unit. The radiofrequency transmitter can be configured to emit a radiofrequency signal stream into a region of interest using the at least one transmission antenna. The radiofrequency receiver can be configured to receive a scattered signal stream from the region of interest using the at least one reception antenna, the scattered signal stream generated in the region of interest from the radiofrequency signal stream emitted by the radiofrequency transmitter when a target is at least partially within the region of interest. The controller can be configured to identify a plurality of resonant signal components from the scattered signal stream, generate a plurality of preprocessed resonant signal components by removing at least one signal component from the plurality of resonant signal components, where the at least one signal component removed corresponds to the stored environmental signal components, determine a target assessment from the plurality of preprocessed resonant signals using the statistical model, and trigger a target response if the target assessment indicates the weapon is detected on the target.

In some embodiments, the controller can be further configured to identify the plurality of resonant signal components by identifying a late time response portion of the scattered signal stream, and identifying the plurality of resonant signal components from the late time response portion. In some embodiments, the controller can be further configured to identify the late time response portion by identifying an initial reflection of the emitted radiofrequency stream in the scattered signal stream, and identifying the late time response portion based on the identified initial reflection.

In some embodiments, the controller can be further configured to identify the plurality of resonant signal components by decomposing the scattered signal stream into the plurality of resonant signal components.

In some embodiments, the radiofrequency receiver can be further configured to receive a background scattered signal stream from the region of interest when no targets are within the region of interest using the at least one reception antenna, and the controller can be configured to identify the environmental signal components for the region of interest as a plurality of background resonant signal components from the background scattered signal stream, and store the environmental signal components in the data storage unit.

In some embodiments, the radiofrequency receiver can be configured to intermittently receive a subsequent background signal stream from the region of interest when no targets are within the region of interest using the at least one reception antenna, and the controller can be configured to update the environmental signal components stored in the data storage unit based on the subsequent background signal stream.

In some embodiments, the data storage unit can store a training database having a first dataset with a first plurality of resonant signal components associated with the weapon and a second dataset with a second plurality of resonant signal components associated with a generic target when the weapon is not present on the generic target, and the controller can be configured to generate the statistical model based on the first dataset and the second dataset. In some embodiments, the controller can be further configured to update the second dataset and the statistical model based on the plurality of preprocessed resonant signal components if the weapon is not detected on the target.

In some embodiments, the radiofrequency transmitter can be configured to emit the radiofrequency signal stream polarized to about a first orientation using the at least one antenna, the at least one reception antenna can include a first reception antenna and a second reception antenna, and the radiofrequency receiver can be configured to receive the scattered signal stream at about the first orientation using the first reception antenna and at about a second orientation using the second reception antenna, where the second orientation is substantially orthogonal to the first orientation. In some embodiments, the radiofrequency transmitter can be configured to sequentially emit the radiofrequency signal stream polarized to about the first orientation and the radiofrequency signal stream polarized to about the about the second orientation.

In some embodiments, the radiofrequency transmitter can be configured to emit the radiofrequency signal stream with a frequency range of between about 0.5 GHz and about 5 GHz.

In some embodiments, the radiofrequency transmitter can be positioned at a first periphery region of the region of interest, and the radiofrequency receiver can be positioned at a second periphery region of the region of interest facing the radiofrequency transmitter, where the second periphery region is substantially opposite the first periphery region.

In some embodiments, the radiofrequency transmitter can be positioned at a first periphery region of the region of interest, and the radiofrequency receiver can be positioned substantially adjacent to the radiofrequency transmitter.

In some embodiments, the system can also include a second radiofrequency transmitter spaced apart from the radiofrequency transmitter, the second radiofrequency transmitter can have at least one additional transmission antenna and can be configured to emit a second radiofrequency signal stream into the region of interest. The system can further include a second radiofrequency receiver spaced apart from the radiofrequency receiver, the second radiofrequency receiver can have at least one additional reception antenna and can be configured to receive a second scattered signal stream from the region of interest when the target is at least partially within the region of interest, where the second scattered signal stream is generated in the region of interest from the second radiofrequency signal stream emitted by the second radiofrequency transmitter. The controller can be coupled to the second radiofrequency transmitter and to the second radiofrequency receiver and can be further configured to identify a second plurality of resonant signal components from the second scattered signal stream, generate a second plurality of preprocessed resonant signal components by removing a second at least one environmental signal component for the region of interest from the second plurality of resonant signal components, where the second at least one environmental signal component corresponds to the stored environmental signal components, determine a second target assessment from the second plurality of preprocessed resonant signals using the statistical model, and trigger the target response if the second target assessment indicates the weapon is detected on the target.

In another broad aspect, at least one embodiment described herein provides a non-transitory, computer-readable storage medium storing instructions executable by a processor coupled to the storage medium, the instructions for programming the processor to emit a radiofrequency signal stream into a region of interest using a radiofrequency transmitter and receive a scattered signal stream from the region of interest using a radiofrequency receiver, where the scattered signal stream is generated in the region of interest from the radiofrequency signal stream when a target is at least partially within the region of interest. The computer-readable storage medium can further store instructions for programming the processor to identify a plurality of resonant signal components from the scattered signal stream, generate a plurality of preprocessed resonant signal components by removing at least one signal component from the plurality of resonant signal components, where the at least one signal component correspond to stored environmental signal components for the region of interest, determine a target assessment from the plurality of preprocessed resonant signals using a statistical model that is based on resonant signals associated with the weapon, and trigger a target response if the target assessment indicates the weapon is detected on the target.

In some embodiments, the computer-readable storage medium may further store instructions for performing the steps of various methods for detecting a weapon, wherein the methods are described herein.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now briefly described.

Figure 1:
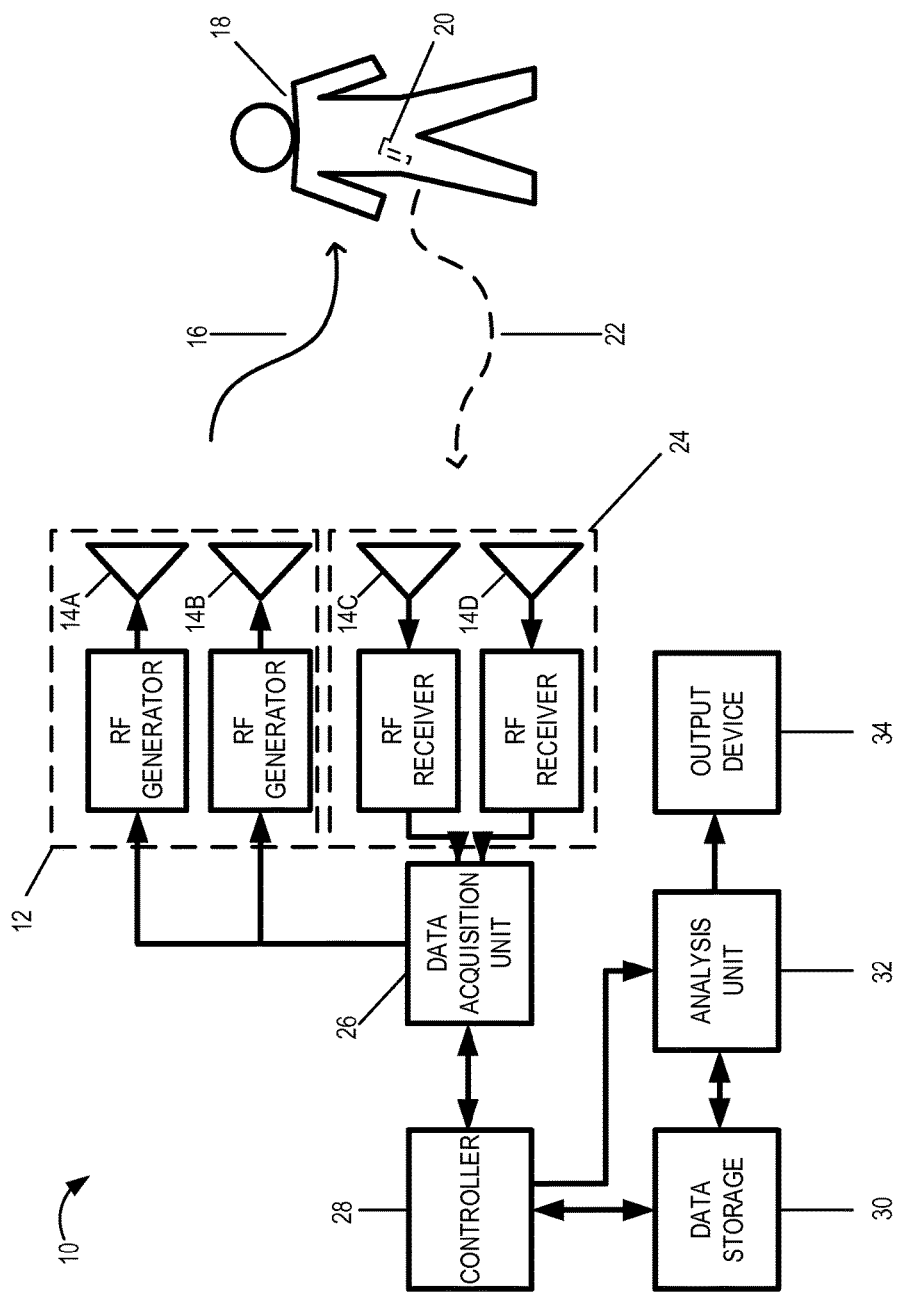
FIG. 1 is a block diagram of an example embodiment of a system for detecting a weapon.

Further aspects and features of the embodiments described herein will appear from the following description taken together with the accompanying drawings.

DETAILED DESCRIPTION OF THE EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal or a mechanical element depending on the particular context. Furthermore, the term "communicative coupling" may be used to indicate that an element or device can electrically, optically, or wirelessly send data to another element or device as well as receive data from another element or device.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Described herein are example embodiments of systems, methods and computer program products for detecting a weapon. In general, the embodiments described herein can be implemented to detect a plurality of different weapons concurrently. Embodiments described herein can be used to detect a weapon concealed on a person (or target) without requiring the target's cooperation.

A number of previous attempts have been made to provide useful weapons detection systems. These systems tend to have various deficiencies such as unreliable weapons detection, require cooperation, or cause privacy concerns.

A number of factors contribute to low detection reliability. Often, weapons detection systems operate in uncontrolled and dynamic (i.e., constantly changing) electromagnetic environments (e.g., inside buildings, in the presence of people, vehicles, furniture, etc.). This variability and unpredictability can increase measurement uncertainties to levels that mask signals scattered from a target (the target radar signatures).

As well, radar signatures of humans (without any weapons) are often much stronger than those of the hidden weapons. Human body signatures are also greatly diverse and hard to predict. As a result, the human radar signature may mask the weak radar signatures emanating from weapons or other objects hidden on the body.

The low detection reliability of many prior systems requires the inspected person to cooperate with the inspection by standing still. For example, handheld systems used to scan an individual's entire body require the individual's cooperation to allow their whole body to be scanned. Whole-body scanners generally require a target to stay still, with arms raised and legs spread to enable the system to image the whole body surface. Even when a target cooperates many prior systems still have insufficient detection reliability for wide commercial development and deployment.

Some prior systems generate an image of a target. These images are then inspected by a system operator to detect the presence of a weapon. Such systems require human intervention to detect the presence of a weapon before a response can be initiated. These systems can be susceptible to operator error, such as errors caused by fatigue or inattention. The images generated by these systems may also raise privacy concerns for the people being imaged.

Embodiments of the systems and methods described herein may overcome some of the above-noted problems with prior weapons detection systems. Some embodiments have been implemented and tested with weapons detection results having sensitivity and specificity above 90%. Some embodiments tested have achieved a sensitivity of 97.2% and specificity of 97.2%.

Embodiments described herein may use radiofrequency or microwave signal streams to detect small weapons, such as handguns, knives, grenades and explosive vests, on persons who may be standing, walking or otherwise moving. Embodiments may covertly analyze individuals and may not require a person to stand still. For example, the weapons detection analysis could be implemented where people walk through a short hallway with system components mounted on or behind the walls.

Embodiments of the system may not generate images, but rather issue a "threat" or "no threat" recommendation. The recommendations can be generated without requiring operator intervention. As such, embodiments of the system described herein may be suitable for the security surveillance of public buildings, schools and any other places where large numbers of civilians enter a place of gathering within a short period of time through well-defined entry points. Embodiments may also be compact, portable, and less expensive than existing millimeter-wave imagers (the whole-body scanners) used for security screening in airports.

The various embodiments described herein use a number of techniques that may help to overcome the above-noted deficiencies. In general, the embodiments described herein can remove background signal components of a region of interest to improve detection reliability of the electromagnetic signal components that corresponds to weapons that may be small and/or concealed.

Some embodiments may use fully polarimetric (co-pol and cross-pol) measurements. This may provide a more complete resonant signature that can be used to detect a concealed weapon. The use of full polarimetry may allow the system to detect a multitude of different concealed weapons, such as knives and vests, in addition to handguns.

As well, some embodiments analyze both the late-time (resonant) and the early-time (specular) portions of the signal components in the scattered signal stream corresponding to a target being inspecting. Early-time portions of signal components (such as the signals acquired with different transmission and reception polarizations) in the scattered signal stream can be used as part of the resonant signature of the scattered signal stream. For example, the early-time portions of the different polarizations can be used as variables in a statistical model used to determine a threat assessment, e.g. by classifying the scattered signal stream as indicative of a threat. In some embodiments, the early-time portion can be normalized with respect to the signal energy (e.g. to remove range dependence). Some embodiments may also employ adaptive signal processing that enable the system to "learn" and "adapt" continuously from measurements performed in the particular environment where it is deployed.

In general, embodiments of the systems and methods described herein do not require a target to cooperate to be inspected. The system can excite and record electromagnetic resonances from a region of interest that includes the environment of the region, the person, and the possible weapon. The electromagnetic resonances are collected in a scattered signal stream. The resonant components from the environment can be removed from the scattered signal stream, e.g. using a clutter suppression method. The remaining resonances (and in some embodiments the early-time signal portions) can then be analyzed using a statistical model such as a classifier to determine if a weapon is present. The result can then displayed and/or used to automatically trigger appropriate countermeasures (i.e. notifying security personal, locking a door, etc.).

Embodiments described herein can be implemented such that weapons are detected without producing any images. Such embodiments can be fully automated and may not require the immediate involvement of a human. As well, these embodiments may avoid privacy concerns associated with image-based weapons detection systems.

The described embodiments can detect electromagnetic signatures of a weapon in a scattered signal stream that is scattered by the inspected person or object. If a weapon is detected, a target response can be automatically triggered. The target response may include a warning signal and/or an automatic response action. The automatic response action may include actions such as photographing or filming the target, closing and/or locking and/or barring an entrance/exit or passageway, automatically alerting response personnel (e.g. police). The warning signal may trigger a manual target response such as the target being further inspected by a security officer.

In general, embodiments of the systems described herein include a radiofrequency transmitter, a radiofrequency receiver, a data storage unit, and a controller coupled to each of the radiofrequency transmitter, radiofrequency receiver, and data storage unit. These embodiments can be used to detect the present of an object on a target passing through a region of interest. If a weapon is detected on the target, the systems can automatically trigger a target response such as an alarm or a lock-down procedure.

The radiofrequency transmitter can include at least one transmission antenna. The radiofrequency transmitter can emit a radiofrequency signal stream into a region of interest using the at least one transmission antenna. In some embodiments, the at least one transmission antenna may include two orthogonally polarized transmitting antennas to transmit the radiofrequency signal stream over the detection region.

The radiofrequency transmitter may be an RF transmitter producing output frequencies within the range of weapon self-resonances. In some embodiments, a frequency stepped sinusoidal signal stream between about 0.5 GHz and about 5 GHz can be emitted. In other embodiments, a wideband pulse can be emitted with a bandwidth from about 0.5 GHz to about 5 GHz. The pulsed generator may provide superior detection speed in some embodiments.

The radiofrequency receiver can include at least one reception antenna. The at least one reception antenna may include two orthogonally polarized antennas to collect the scattered signals. The radiofrequency receiver may receive a scattered signal stream from the region of interest when a target is at least partially within the region of interest using the at least one reception antenna. The scattered signal stream may be generated in the region of interest from the radiofrequency signal stream emitted by the radiofrequency transmitter.

In embodiments where a frequency stepped sinusoidal signal stream is emitted, the magnitude and phase of the backscattered frequency stepped waveform can be received as the scattered signal stream. In embodiments where the wideband pulse is emitted, the scattered signal stream may be recorded through direct or interleaved sampling of the scattered pulse waveform.

The data storage unit can store environmental signal components for the region of interest. The environmental signal components may include electromagnetic signatures acquired from the region of interest when no targets are present in the region of interest. The stored environmental signal components can be used to identify and remove background signal components that may be included in the scattered signal stream acquired when a target is in the region of interest.

The data storage unit can also store a statistical model that is based on resonant signals associated with the weapon or weapons being detected. The statistical model may be generated using machine learning techniques such as regression or clustering for example. A training database may be used to generate the statistical model. The training database may include electromagnetic signal components associated with the weapon or weapons being detected. The training database can also include electromagnetic signal components associated with generic targets (e.g. many different people) when no weapon is present. The electromagnetic signal components stored in the training database can include both early-time response portions and late-time response portions of scattered signals.

In some embodiments, the training database can be built and stored in the data storage unit before deployment. The statistical model can be trained using the training database before deployment. The training database can be updated with measurements acquired from the region of interest after deployment. The statistical model can then be re-trained to improve performance in that particular region of interest.

The controller can communicate with each of the radiofrequency transmitter, radiofrequency receiver, and data storage unit. The controller may configure each of these components for operation, or receive data for analysis from these components. In general, the controller can be a signal processor used to remove background signal components and detect the presence of weapon resonances in the scattered signals.

The controller can receive the scattered signal stream from the radiofrequency transmitter. The controller can identify a plurality of resonant signal components from the received scattered signal stream. For example, the plurality of resonant signal components may be identified using decomposition into complex resonant sinusoids (e.g. a Prony expansion). In some cases, the scattered signal stream may be digitized prior to being received at the controller, or the controller itself may digitize the scattered signal stream. For example, the radiofrequency receiver may convert the scattered signal stream into digitized waveforms.

The controller can generate a plurality of preprocessed resonant signal components by removing at least one signal component from the plurality of resonant signal components. The at least one signal component removed may correspond to the environmental signal components stored in the data storage unit. For example, the controller may compare the plurality of resonant signal components to the environmental signal components and remove those signal components determined to have been generated by the background of the region of interest.

The controller can generate a target assessment from the plurality of preprocessed resonant signals using the statistical model. The target assessment may classify the target into various categories such as a threat category or a non-threat category. In some cases, the target assessment may classify the target into a particular weapon category. In some cases, the target assessment may indicate a probability that the target is a threat/non-threat or the probability of one or more particular weapon categories. For example, a neural network classifier may be used with/generated from the data stored in the training database.

The controller may trigger a target response if the target assessment indicates the weapon is detected on the target. For example, if the target assessment classifies the target into a "threat" category or the probability that the target is a threat is above a threat threshold, the target response may be triggered. In some cases, multiple different target response may be triggered depending on the target assessment. For example, multiple threat thresholds may be used and different target responses may be generated for each threshold. A warning signal may be triggered for a first threshold indicating that a manual inspection is warranted, whereas an automatic action response, such as a lock-down procedure may be triggered for a second threshold. Similarly, different target responses may be triggered for different weapon categories, e.g. a knife as compared to an explosive.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile and non-volatile memory and/or storage elements). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, $C^{++}$ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

Referring now to FIG. 1, shown therein is block diagram of an example system 10 for detecting a weapon. System 10 includes a radiofrequency transmitter 12, a radiofrequency receiver 24, a controller 28 and a data storage unit 30.

In the example of system 10, the radiofrequency transmitter 12 includes two transmission antennae 14A and 14B. The example radiofrequency transmitter 12 also includes a pair of radiofrequency generator units, one radiofrequency generator coupled to each transmission antennae 14A and 14B.

One or both of the RF generators may generate a radiofrequency signal stream. For example, the RF generators may be a stepped frequency source or a wideband pulse generator. The RF generators are used to generate a radiofrequency signal stream in a frequency band in which weapon resonances are expected. For examples, the RF generators may operate with a frequency range of between about 0.5 GHz and about 5 GHz. The RF generators used by the radiofrequency transmitter 12 can operate at power levels well below the required Specific Absorption Rate (SAR) for uncontrolled environments.

In some embodiments, e.g. to comply with safety requirements, the power level of the RF generators in the area in which human presence is expected can be below 10 W/m$^2$. In some embodiments, power levels between 8 dBm and 16 dBm can be used to examine targets at ranges between 2 m and 5 m.

The radiofrequency transmitter 12 can emit the radiofrequency signal stream into a region of interest using the antennae 14A and 14B. The emitted radiofrequency signal stream is shown in FIG. 1 as incident waveform 16. In some embodiments, the radiofrequency transmitter 12 can be configured to emit the radiofrequency signal stream as a polarized signal stream. The radiofrequency signal stream can be polarized to about a first orientation using the antennae 14A and 14B. For example, the radiofrequency transmitter may emit the radiofrequency signal stream polarized to about the first orientation using the first antenna 14A.

In some embodiments, the radiofrequency transmitter 12 can be configured to sequentially emit the radiofrequency signal stream polarized to about the first orientation and the radiofrequency signal stream polarized to about a second orientation, where the second orientation is substantially orthogonal to the first orientation. The antennas 14A and 14B can be polarimetric, first transmitting one polarization orientation, then the second one, sequentially.

The incident waveform 16 can reflect off of a person 18 at least partially within the region of interest as well as a possible weapon 20. Objects that resonate with the frequency of the incident waveform 16 can be excited electromagnetically to become weak transmitters and scatter energy towards the receiver. This reflected and scattered energy may be referred to as a scattered signal stream. The scattered signal stream is shown as backscattered waveform 22. The backscattered waveform 22 contains both the initial reflection (Early Time Response) as well as the resonance (Late Time Response) generated from the radiofrequency signal stream.

The radiofrequency receiver 24 includes a first reception antenna 14C and a second reception antenna 14D. The radiofrequency receiver 24 can be configured to receive the scattered signal stream 22 from the region of interest when the target 18 is at least partially within the region of interest using the antennae 14C and 14D. In some cases, the antennae 14C and 14D can be configured to receive the scattered signal stream 22 at the first orientation.

In some embodiments, the radiofrequency receiver 24 can be configured to receive the scattered signal stream 22 at about the first orientation using the first reception antenna 14C and at about the second orientation using the second reception antenna 14D. Two orthogonally polarized antennas 14C and 14D can be used to receive the scattered signal stream. In embodiments where the antennas 14A and 14B are polarimetric, for each transmitting polarization, the two orthogonally polarized antennas 14C and 14D can receive.

In some embodiments of system 10, a single polarization can used for both the emitted radiofrequency signal stream 16 and the scattered signal stream; one polarization is transmitted, and the same polarization is received (single measurement). In other embodiments, a semi-polarimetric system can used; one polarization can transmitted, and two can be received (two measurements). In further embodiments, system 10 may be fully polarimetric; two orthogonal polarizations can be transmitted, one at a time (sequentially), and for each transmission two polarizations can be received (four measurements).

The radiofrequency receiver 24 can digitize the scattered signal stream 22. In some embodiments, e.g. where a stepped frequency source is used, this can be accomplished by measuring the magnitude and phase of the scattered signal stream 22 at the same frequency in which the stepped transmitter is operating. In other embodiments, e.g. where a wideband pulse generator is use, this can be accomplished by direct or interleaved sampling of the scattered signal stream 22. In some cases, direct or interleaved sampling may be preferred as it can provide faster sampling speed.

The controller 28 can be coupled to each of the radiofrequency transmitter 12, the radiofrequency receiver 28, and a data storage unit 30 using a wired or wireless communication module (e.g., Bluetooth, IEEE 802.11, etc.). The controller 28 can be any type of processing device such as a personal computer, a tablet, and a mobile device such as a smartphone or a smartwatch for example.

The data acquisition unit 26 can be used to buffer the scattered signal stream data from the receiver 24. The data acquisition unit 26 can also synchronize the RF transmitter 12 and RF receiver 24. The controller 28 can be configured to perform the initial signal processing and background removal. In some embodiments, the data acquisition unit 26 and controller 28 can be combined as a single unit.

In some embodiments using multiple RF transmitter and RF receiver stations (as discussed below with reference to FIG. 3), the data acquisition unit 26 can be used to synchronize the RF transmitters and RF receivers from each of the detection stations. The synchronization can enable the controller 28 to detect and account for any interference from a RF signal stream emitted from other RF transmitters in the deployment environment.

The controller 28 can include a processing unit, a display such as display 34, a user interface, an interface unit for communicating with other devices, Input/Output (I/O) hardware, a wireless unit (e.g. a radio that communicates using CDMA, GSM, GPRS or Bluetooth protocol according to standards such as IEEE 802.11a, 802.11b, 802.11g, or 802.11n), a power unit and a memory unit. The memory unit can include RAM, ROM, one or more hard drives, one or more flash drives or some other suitable data storage elements such as disk drives, etc.

The processing unit may control the operation of the controller 28 and can be any suitable processor, controller or digital signal processor that can provide sufficient processing power processor depending on the desired configuration, purposes and requirements of the system 10.

The data storage unit 30 may store environmental signal components for the region of interest. The data storage unit 30 may also store a statistical model based on resonant signal portions and early time signal portions associated with a weapon or weapons to be detected by system 10. For example, the data storage unit 30 may store a training database of pre-recorded weapon resonances and people without weapons. The training database may include a first dataset with a first plurality of resonant signal components (and early time signal components) associated with the weapon or weapons to be detected. The training database may also include a second dataset with a second plurality of resonant signal components (and early time signal components) associated with a generic target when the weapon or weapons are not present on the generic target The controller 28 may subject the signal stream from the data acquisition unit 26 to background removal and further analysis. The background removal may be performed using the environmental signal components stored in the data storage unit 30.

Once signal components corresponding to the environmental signal components are removed, the scattered signal stream can be assessed to determine if a weapon is present. The analysis unit 32 may analyze or classify the waveform based on the statistical model stored in the data storage unit 30. In some cases, the analysis unit 32 may be integrated with the controller 28.

The analysis unit 32 can determine a target assessment using the statistical model. The target assessment may be a classification indicating that a weapon or particular type of weapon is present on the target 18, or that the target is a threat/non-threat. The target assessment may also be a probability or value indicating the likelihood that a weapon is present on the target 18.

If the target assessment value indicates the weapon is detected on the target 18, a target response can be triggered. For example, the target response may be communicating the target assessment classification in some form (visual display, audible warning) using output device 34. This may allow an operator or security personnel to determine the appropriate response. The target response can also trigger an action response such as locking a door, sending an alarm to security personnel, etc.

In some embodiments, the system 10 may be mounted on or behind a wall or in a doorway. In some cases, higher detection ranges up to 5 m can be achieved subject to increased transmitted power. In such cases, the system 10 may also simultaneously inspect several people.

The system 10 can provide a weapons detection result in real time, performing multiple measurements within a matter of seconds to ensure a reliable response. In various embodiments, system 10 can be used for detecting weaponry such as handguns, non-powdered explosives, knives, etc., that may be non-magnetic, and possibly non-metallic. Embodiments of the system 10 may also be able to distinguish to innocuous objects such as belt buckles, jewelry, cellular phones, keys, etc. The statistical model may be trained to distinguish weapons from such innocuous items.

Figure 2:
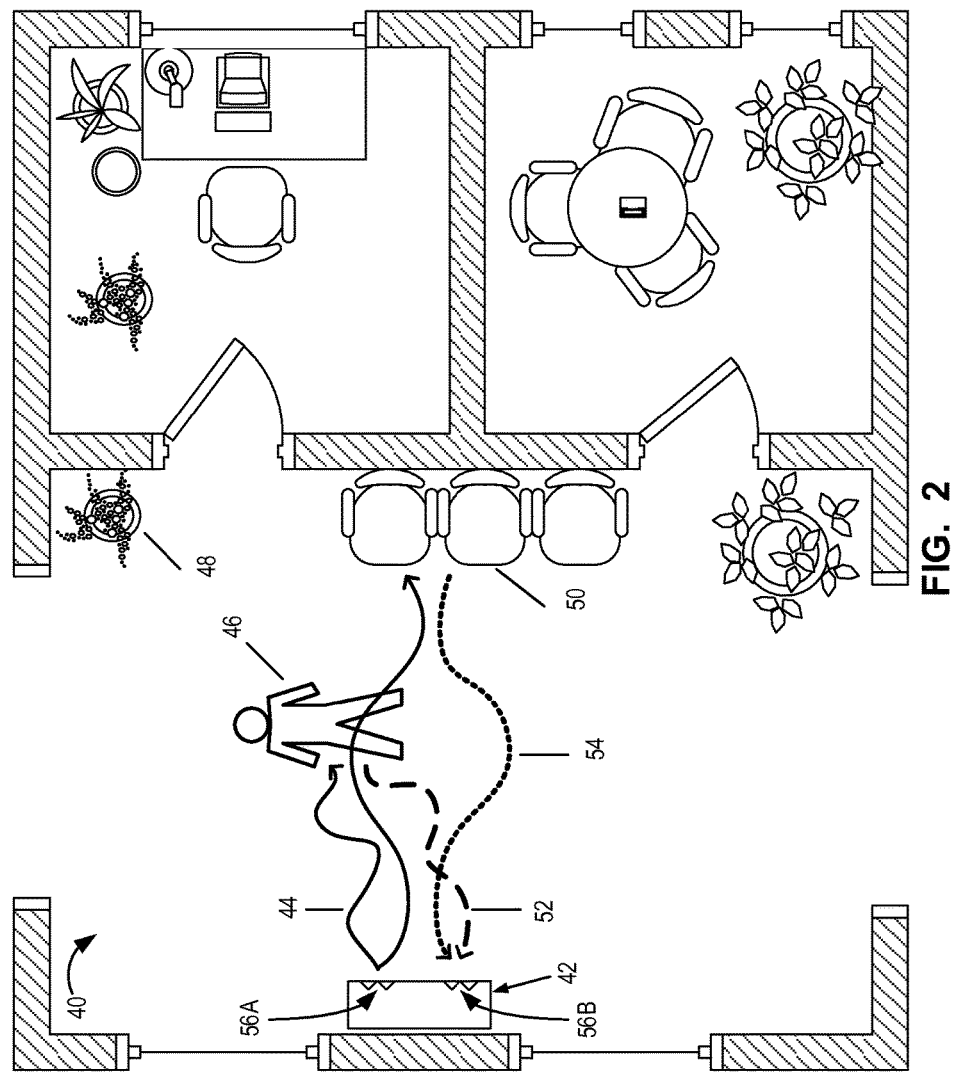
FIG. 2 shows a top view of the system of FIG. 1 in an example monostatic configuration.

Referring now to FIG. 2, shown therein is a top view of an example weapons detection system 42 deployed in a monostatic configuration to inspect a region of interest 40. The system 42 may be similar to embodiments of system 10. The system 42 is deployed in a cluttered hallway 40. In the example show here, a single monostatic system 42 is deployed.

The system 42 includes the radiofrequency transmitter 56A positioned at a first periphery region of the region of interest. The radiofrequency receiver 56B is positioned substantially adjacent to the radiofrequency transmitter 56A on the same side of the hallway 40.

The emitted radiofrequency signal stream 44 illuminates a person 46 as well as clutter such as chairs 50 and plants 48 in the background environment. The scattered signal stream received by the radiofrequency receiver 56B includes the backscattered waveform 52 from the person 46 mixed with the backscattered waveform 54 from the clutter 50. To ensure reliable weapons detection, the backscattered waveform 52 from the person 46 should be isolated.

The removal of background signal components can be difficult when system 10 is deployed in unpredictable and changing environments. The system 10 may periodically take and store measurements of the environment (especially when this environment changes significantly). These measurements may be used to remove resonances associated with the environment from the received waveform before analysis for weapons.

The radiofrequency receive 56B can be configured to receive a background scattered signal stream from the region of interest 40 when no targets 46 are within the region of interest 40 using at least one reception antenna. The controller of system 42 can then be configured to identify the environmental signal components for the region of interest 40 as the plurality of background resonant signal components from the background scattered signal stream. The controller can then store the environmental signal components in the data storage unit.

The radiofrequency receiver 56B can be configured to periodically or intermittently receive a subsequent background signal stream from the region of interest 40 when no targets are within the region of interest 40 using the at least one reception antenna. The controller may then update the environmental signal components stored in the data storage unit based on the subsequent background signal stream. By frequently measuring the background signal stream, detection in a dynamically changing environment can be accomplished.

Figure 3:
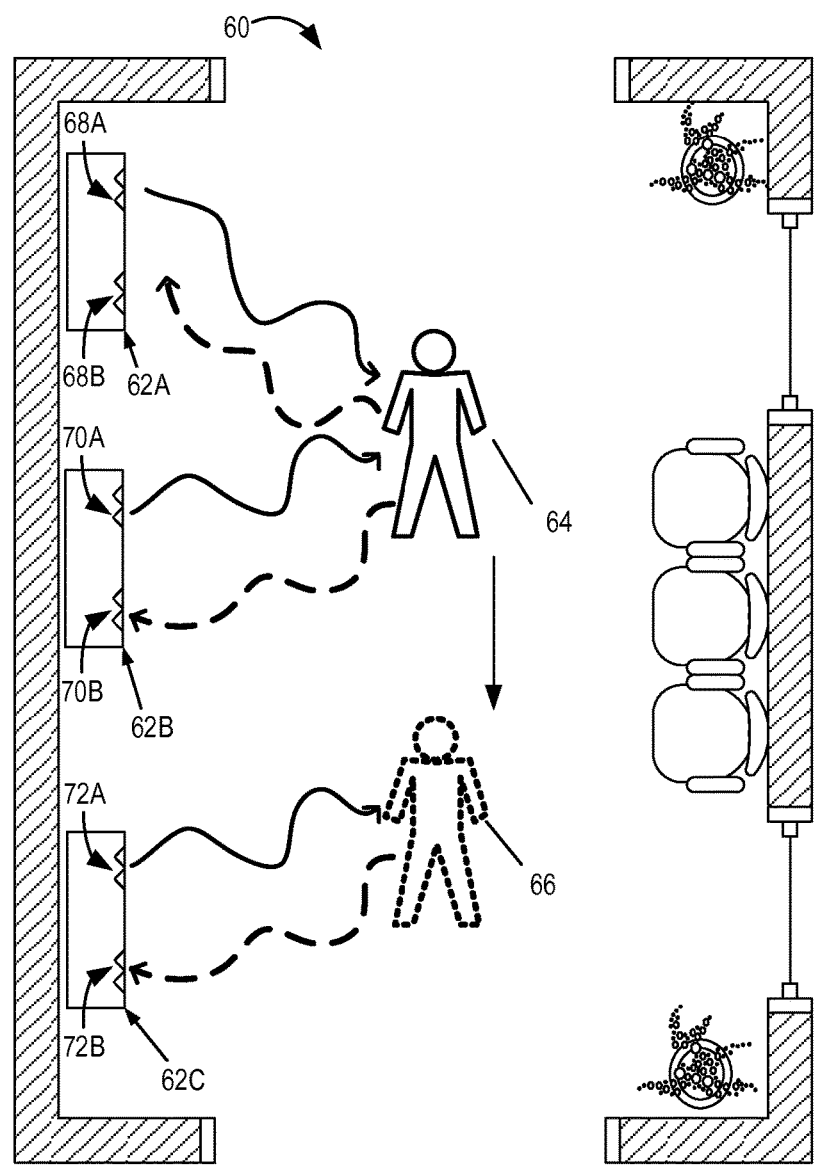
FIG. 3 shows a top view of the system of FIG. 1 in an example deployment configuration with multiple monostatic stations.

Referring now to FIG. 3, shown therein is a top view of an example weapons detection system 62 deployed with multiple monostatic weapons detection stations 62A-62C to inspect a region of interest 60. Weapons detection may be improved by adding several monostatic stations 62A-62C to obtain multiple views of the target 64, as well as track the targets motion 66 through the detection region.

Each monostatic station 62A-62C may be examples of weapons detection system 10 or system 42. In some embodiments, each monostatic station 62A-62C may have a separate controller. In other embodiments, each monostatic station 62A-62C may be coupled to a central controller, such as controller 28, to analyze the scattered signal streams received from each weapons detection station 62A-62C.

The system 62, includes a first weapons detection station 62A having a radiofrequency transmitter 68A and a radiofrequency transmitter 68B. The second weapons detection station 62B is spaced apart from the first weapons detection station 62A. The second weapons detection station 62B includes a second radiofrequency transmitter 70A spaced apart from the radiofrequency transmitter 68A. The second weapons detection station 62B also includes a second radiofrequency receiver 70B spaced apart from the radiofrequency receiver 68B.

The second radiofrequency transmitter 70A may include at least one additional transmission antenna and can be configured to emit a second radiofrequency signal stream into the region of interest 60. The second radiofrequency receiver 70B also has at least one additional reception antenna and can be configured to receive a second scattered signal stream from the region of interest 60 when the target 64 is at least partially within the region of interest 60. The second scattered signal stream can be generated in the region of interest 60 (i.e. from the target 64 and the background) from the second radiofrequency signal stream emitted by the second radiofrequency transmitter 70A.

The third weapons detection station 62C can also be spaced apart from the first detection station 62A and second weapons detection station 62B. The third weapons detection station 62C also includes a third radiofrequency transmitter 72A and a third radiofrequency receiver 72B. Each of the radiofrequency transmitters 68A, 70A, and 72A may be similar to radiofrequency transmitter 12. Similarly, each of the radiofrequency receivers 68B, 70B, and 72B may be similar to radiofrequency receiver 24.

The monostatic stations 62A-62C in FIG. 3 are placed along one wall of a hallway region of interest 60. Stations 62A and 62B obtain two views of the target 64 allowing for increased illumination of the front, back and side of the person 64. This may improve the ability to excite the resonances of possible weapons. As the person 64 moves further down the hallway, towards position 66, the additional monostatic station 62C may start to illuminate the person 64. If a threat is detected using station 62A it can be tracked by following the person 64 as he/she passes through the additional detectors 62B and 62C.

Interference between the signals generated by multiple detection stations may occur if the detection stations are in close proximity. The controller 28 can account for any such interference during the environment characterization process by synchronizing the RF transmitters 68A, 70A, and 72A and RF receivers 68B, 70B, and 72B. Signal components corresponding to the interference can be identified as environmental signal components in a background scattered signal stream and stored in data storage unit 30.

Where multiple detection stations are used, each detection stations may acquire and store station specific environmental signal components. These station specific environmental signal components can be used to analyze the scattered signal streams acquired by those specific detection stations. In other words, the environment characterization process described herein can be performed for each station. The environmental signal components for each station can contain any interference signal components from neighboring stations. As well, target assessment (i.e. weapons detection or classification) process can be used with data from any one of, or all, detection stations.

Figure 4:
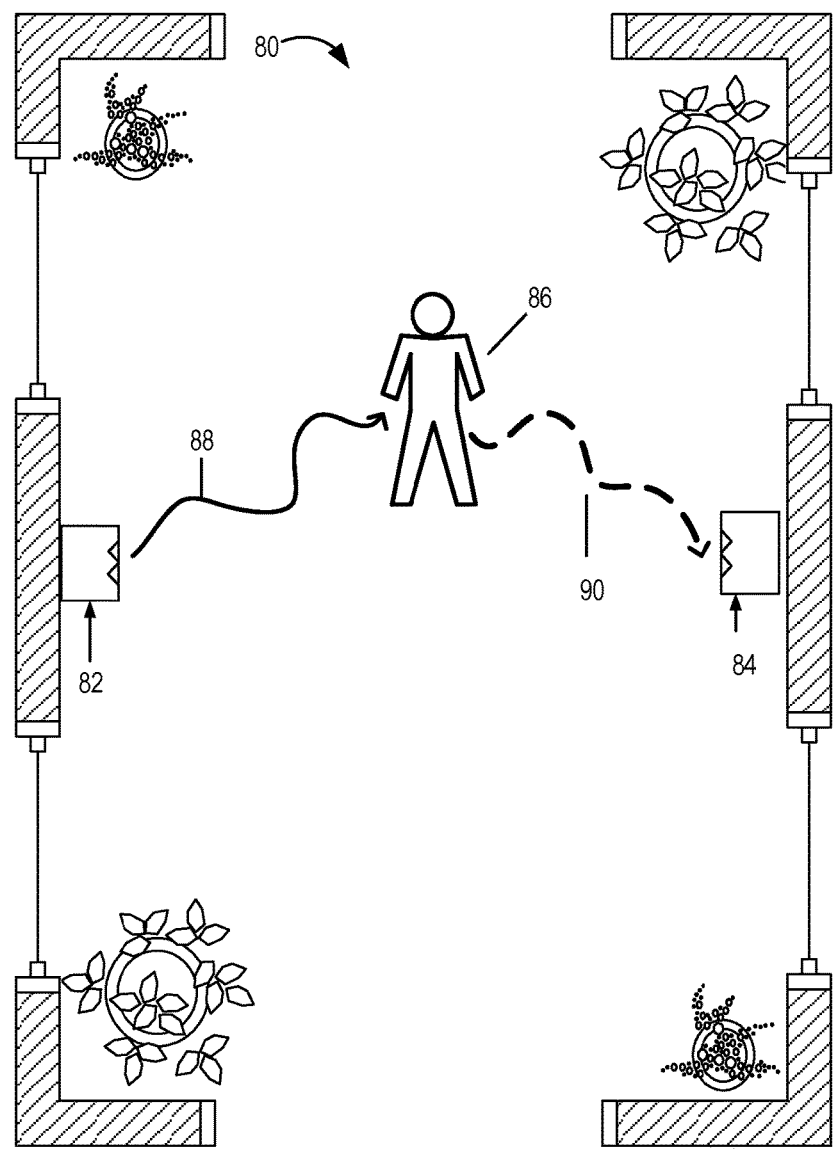
FIG. 4 shows a top view of the system of FIG. 1 in an example bi-static configuration.

Referring now to FIG. 4, shown therein is a top view of an example weapons detection system deployed in a bi-static configuration to inspect a region of interest 80. The weapons detection system includes a radiofrequency transmitter 82, similar to radiofrequency transmitter 12, positioned at a first periphery region of the region of interest 80. The weapons detection system can include a radiofrequency receiver 84, similar to radiofrequency receiver 24, positioned at a second periphery region of the region of interest 80 facing the radiofrequency transmitter 82 and substantially opposite the first periphery region. For example, radiofrequency transmitter 82 and radiofrequency receiver 84 can be placed on opposite sides of a hallway, possibly concealed behind the wall.

The transmitting module will illuminate the person 26 with the radiofrequency signal stream 88. Then, any resonant structure will radiate energy 90 towards the receiving module that can be captured as part of the scattered signal stream. A centralized processor such as the controller 28 can then perform weapons detection as described herein.

In some embodiments, a bi-static configuration such as the configuration shown in FIG. 4 may be preferred. Embodiments of the bi-static configuration may provide an increased detection region (i.e. a larger region of interest). As well, embodiments of the bi-static configuration may provide more viewing angles for detecting weapons positioned on a person.

In other embodiments, monostatic configurations such as the configurations shown in FIGS. 2 and 3 may be preferred. Monostatic configuration may allow a simpler deployment and setup in the deployment environment. As a consequence, monostatic configurations may be less costly to buy and install. As well, results may be obtained more rapidly using a monostatic configuration.

In some embodiments, multiple detection stations can also be used with a bi-static configuration such as the bi-static configuration shown in FIG. 4. In essence, multiple detection stations can be configured, each with an RF transmitter similar to RF transmitter 82 and an RF receiver similar to RF receiver 84. In general, the operation of multiple detection stations in a bi-static configuration will be similar to those described above with reference to FIG. 3.

Figure 5:
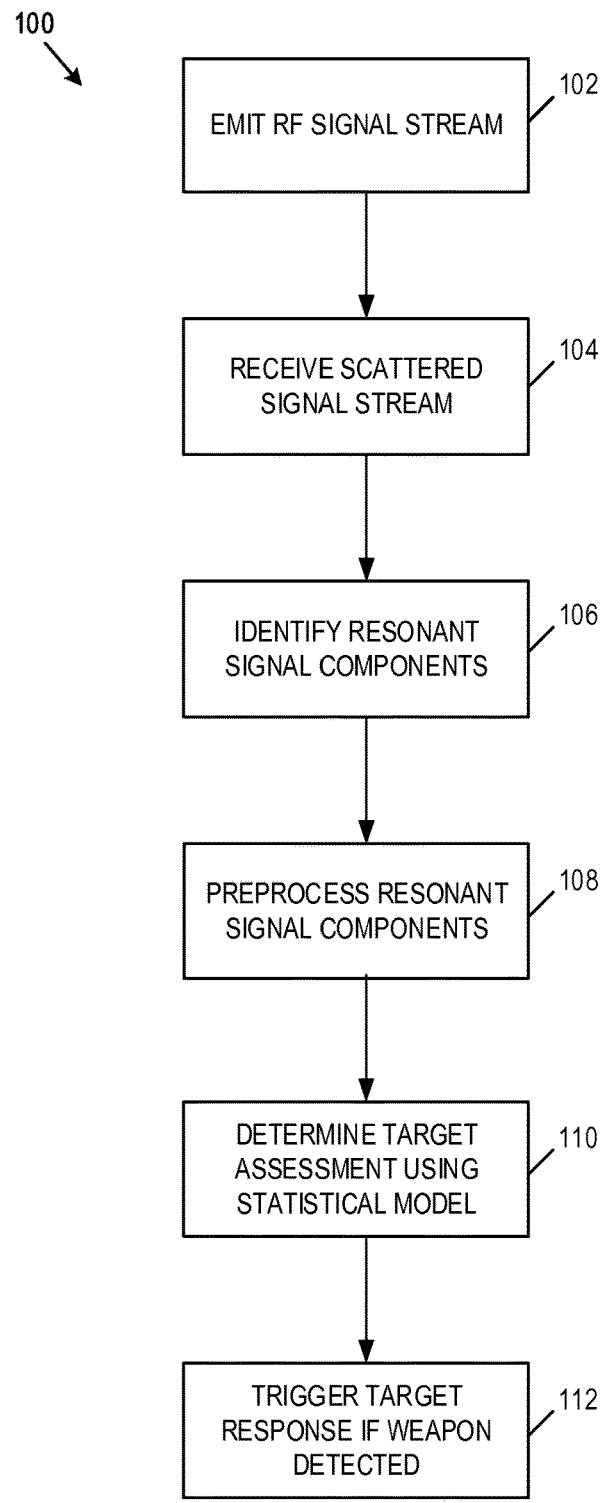
FIG. 5 shows a flowchart of an example process for detecting a weapon that may be implemented by the system of FIG. 1.

Referring now to FIG. 5, shown therein is a flowchart of an example process 100 for detecting a weapon. Process 100 is an example of a weapons detection process that may be implemented by the weapons detection system 10. For clarity, process 100 will be described in the context of its implementation with system 10; however it should be apparent that other configurations of weapon detection systems may be used to implement the process 100.

At 102, the radiofrequency transmitter 12 can emit a radiofrequency signal stream into a region of interest. As mentioned above, the radiofrequency signal stream can be generated over a range or band of frequencies expected to include self-resonant frequencies associated with a weapon or weapons being detected. For example, the emitted radiofrequency signal stream may have a frequency range of between about 0.5 GHz and about 5 GHz.

The RF transmitter 12 may emit various types of the radiofrequency signal streams. For example, in some cases a wideband pulse can be used with a frequency band that includes the weapon self-resonance frequencies of interest. In other cases, different signal types, such as a frequency stepped signal source may be used.

At 104, the radiofrequency transmitter 24 can receive a scattered signal from the region of interest. The scattered signal stream may be generated in the region of interest from the radiofrequency signal stream when a target, such as target 18, is at least partially within the region of interest. The scattered signal stream may include signal components corresponding to the target, potential weapons on the target, and background signal components from the environment of the region of interest.

As mentioned above, different polarimetry configurations may be used to emit the radiofrequency signal stream and to receive the scattered signal stream. For example, the RF transmitter 12 may emit the radiofrequency signal stream polarized to about a first orientation. The RF receiver 24 may then receive (or measure) the scattered signal stream at about the first orientation and at about a second orientation, where the second orientation is substantially orthogonal to the first orientation.

In some cases, the RF transmitter 12 may emit the radiofrequency signal stream sequentially polarized to about the first orientation and to about the second orientation. The RF receiver 24 may then receive (or measure) the scattered signal stream at about the first orientation and at about the second orientation, effectively taking 4 separate measurements of the resonant signals generated in the region of interest.

At 106, the controller 28 may identify a plurality of resonant signal components from the scattered signal stream. The controller may identify the plurality of resonant signal components by decomposing the scattered signal stream into a plurality of resonant signal components. For example, the scattered signal stream may be decomposed into decaying sinusoids.

The controller 28 may identify a late time response portion of the scattered signal stream. The controller 28 may then identify the plurality of resonant signal components from the late time response portion. The late time response portion of the scattered signal stream may be identified by identifying an initial reflection of the emitted radiofrequency stream in the scattered signal stream. The controller 28 may then identify the late time response portion based on the identified initial reflection. The identification of the late times response portion will be described in further detail below with reference to FIG. 6.

At 108, the controller 28 can generate a plurality of preprocessed resonant signal components by removing at least one signal component from the plurality of resonant signal components. The at least one signal component removed by the controller 28 may corresponds to stored environmental signal components for the region of interest.

The data storage unit 30 may store a plurality of environmental signal components for the region of interest. In some cases, some of the stored environmental signal components may be stored prior to deployment of system 10. In some embodiments, the stored environmental signal components can be generated or updated based on scattered signal streams collected while the system 10 is deployed near the region of interest.

The environmental signal components for a region of interest can be determined by receiving a background scattered signal stream from the region of interest when no targets are within the region of interest. The controller 28 may then identify the environmental signal components as a plurality of background resonant signal components from the background scattered signal stream, e.g. using the decomposition techniques described above at 106. The controller 28 can then store the identified environmental signal components in the data storage unit 30.

The system 10 may be configured to update the environmental signal components while deployed. This may allow system 10 to adapt to changes in the environment of the region of interest. This may also allow system 10 to account for any interference from nearby detection stations, when multiple weapons detection stations are used in a deployment environment.

Background scattered signal streams can be periodically or intermittently received by the RF receiver 24. The controller 28 may then analyze the background scattered signal streams to identify an updated plurality of background resonant signal components, and update the environmental signal components for the region of interest stored in the data storage unit 30.

At 110, the controller 28 or analysis unit 32 can determine a target assessment from the plurality of preprocessed resonant signals. The target assessment may be determined using a statistical model that is based on resonant signals and early time portion signal components associated with the weapon or weapons being detected. As mention above, the target assessment may be determined in various ways such as a classification of threat/non-threat or a probability/likelihood that a weapon is detected.

The statistical model can be generated using a training database. The training database may include a first dataset with a first plurality of resonant signal components associated with the weapon or weapons being detected. The first dataset can also include early time portion signal components associated with the weapon or weapons being detected. The training database may also include a second dataset with a second plurality of resonant signal components associated with a generic target when the weapon is not present on the generic target. The first dataset can also include early time portion signal components associated with associated with the generic target when the weapon is not present on the generic target. Various machine learning techniques may be applied to generate the statistical model to different between preprocessed resonant signals indicative of a threat or weapons, and those indicating no threat is present.

In some embodiments, the training database may be initially stored on the data storage unit 30 based on experimental measurements of weapons and people without weapons. The initial training database may include measurements of weapons (the first dataset) and people without weapons (the second dataset) measured in an environment different from that of the deployment environment. In some embodiments, the system 10 may intermittently or continually update the training database, and re-train the statistical model, based on measurements from the region of interest.

In some embodiments, the first or weapons dataset may be updated through regular software updates as more weapons are measured. This allows the system 10 to maintain up to date information about possible threat objects. Similarly, the second or persons dataset may also be updated through regular software updates.

In some embodiments, the controller 28 can update the second dataset based on the plurality of preprocessed resonant signal components (and early time portion signal components) if a weapon is not detected on a target passing through the region of interest. In effect, the second dataset can be updated with confirmed measurements of people without weapons in the deployment environment. The measurements of people without weapons in the deployment environment may be confirmed in various ways, such as by a physical search by an operator or using an imaging system. This may allow the system to learn and adapt to the deployment environment for weapons detection.

At 112, the controller 28 may trigger a target response if the target assessment indicates that a weapon is detected on the target. For example, the target response may be a visual or audible alert or warning output using output device 34. This may indicate to an operator or security personnel that a threat is detected and a response is required.

In some embodiments, an automatic target response can be generated. For example, the region of interest may be secured by locking or sealing a particular exit or entrance way, additional detection mechanisms could be initiated, an alert could be transmitted to remote security personnel, or a monitoring device such as a video camera could be activated to track the target. The automatic target response may automatically initiate additional security or detection measures without requiring intervention by an operator.

Figure 6:
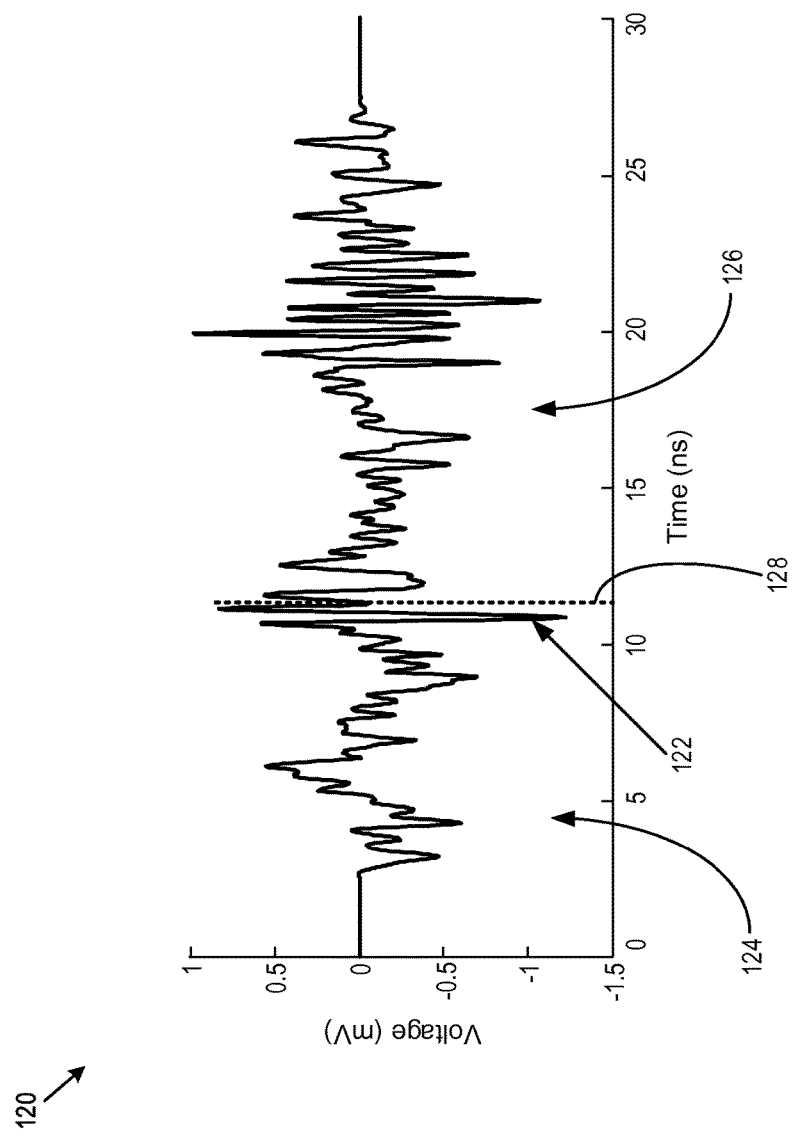
FIG. 6 shows a sample waveform of a scattered signal stream.

Referring now to FIG. 6, shown therein is a plot 120 illustrating a waveform of an example scattered signal stream. To extract the resonance information from the received scattered signal stream, the late time response portion 126 (LTR) can be used. To do so, the LTR 126 can be identified in the received waveform before resonance processing is performed.

As shown in plot 120, to determine where the separation between the LTR 126 and early time response portion (ETR) 124, the initial reflection 122 from the object can be detected. The initial reflection 122 can be identified by correlating the scattered signal stream with a reflection of the emitted radiofrequency signal stream stored in data storage unit 30. For example, the template waveform used for the correlation can be measured as a waveform received, after the emitted radiofrequency signal stream is reflected of a metallic sheet. This may incorporate distortions caused by the antennas into the template waveform. In some embodiments, a matched filter can be used for the correlation. A matched filter can result in a peak when a template waveform is similar to the received waveform.

Once the position of the initial reflection 122 has been detected, filters can be used to separate the LTR 126 and ETR 128. The delineation between the LTR 126 and ETR 128 is shown as 128 in plot 120. Various types of filtering can be used to separate the LTR 126 and ETR 128. For example, the filtering can be done using windowing and/or Gaussian filters, as well as various digital filters (FIR/IIR).

The resonance information may then be obtained by decomposing the waveform into decaying sinusoids. Various methods can be used, such as a least squares matrix pencil method, a generalized pencil-of-function or the SVD-Prony method. In some cases, the matrix pencil method may be preferred due to its robust noise performance. The matrix pencil method based on time-domain representation of the signals, so if a frequency stepped generator is used, the received waveform data must be passed through a Fourier transform before decomposition.

EXAMPLES

In one example embodiments of system 10, using full polarimetry, background removal and environmental adaptation, results such as those presented in Table 1 can be obtained. Table 1 shows a table of results obtained with a frequency stepped embodiment of system 10. The results shown in Table 1 were obtained using a frequency stepped signal that was stepped from 500 MHz to 5 GHz.

TABLE 1

| Probability of Threat | |
| --- | --- |
| Measurement(index) | $P_T$ |
| thin/W1/front/near (1) | 0.999 |
| thin/W1/back/near (2) | 0.999 |
| thin/W1/side/near (3) | 0.997 |
| thin/W2/front/near (4) | 0.999 |
| thin/W2/back/near (5) | 0.996 |
| thin/W2/side/near (6) | 0.918 |
| thin/W3/front/near (7) | 0.971 |
| thin/W3/back/near (8) | 0.919 |
| thin/W3/side/near (9) | 0.976 |
| thick/W1/front/near (10) | 0.912 |
| thick/W1/back/near (11) | 0.989 |
| thick/W1/side/near (12) | 0.923 |
| thick/W2/front/near (13) | 0.955 |
| thick/W2/back/near (14) | 0.990 |
| thick/W2/side/near (15) | 0.963 |
| thick/W3/front/near (16) | 0.945 |
| thick/W3/back/near (17) | 0.924 |
| thick/W3/side/near (18) | 0.889 |
| thin/W1/front/far (19) | 0.997 |
| thin/W1/back/far (20) | 0.996 |
| thin/W1/side/far (21) | 0.946 |
| thin/W2/front/far (22) | 0.999 |
| thin/W2/back/far (23) | 0.999 |
| thin/W2/side/far (24) | 0.123 |
| thin/W3/front/far (25) | 0.998 |
| thin/W3/back/far (26) | 0.999 |
| thin/W3/side/far (27) | 0.997 |
| thick/W1/front/far (28) | 0.998 |
| thick/W1/back/far (29) | 0.186 |
| thick/W1/side/far (30) | 0.977 |
| thick/W2/front/far (31) | 0.998 |
| thick/W2/back/far (32) | 0.042 |
| thick/W2/side/far (33) | 0.998 |
| thick/W3/front/far (34) | 0.999 |
| thick/W3/back/far (35) | 0.998 |
| thick/W3/side/far (36) | 0.998 |
| thin/no-weapon/far (37) | 0.000 |
| thick/no-weapon/far (38) | 0.000 |

Table 1 represents measurements from persons carrying one of two different handguns (W1 and W1), a knife (W3), or no-weapon. The weapons were concealed underneath a thin or a thick jacket on the front, side, and back of a person facing the system. Incorrect results (24, 29, and 32) were obtained three times when the person is farther from the system (>1.5 m). As the person is farther from the system, weapons detection may become less reliable unless power levels are increased.

Table 2 shows a confusion matrix of another set of measurements with 4 different weapons, in this case 1 Gun, 2 knives, and 1 baton. The results shown in Table 2 were obtained from measurements at a distance of 1.5 m with frequencies stepped between 500 MHz to 5 GHz.

TABLE 2

| | Predicted Class | |
|---|---|---|
| Actual Class | Non-Threat | Threat |
| Non-Threat | 35 | 1 |
| Threat | 1 | 35 |

To obtain the measurements shown in Table 2, an embodiment of system 10 with background removal, adaptive features, and classification using a neural network was used. As Table 2 shows, only two out of 72 measurements were miss-classified. This yields a high sensitivity of 97.2% and a specificity of 97.2%. Sensitivity is defined as:

$$\text{Sensitivity} = \frac{TP}{TP + FN} \cdot 100\%,$$

and specificity as $$\text{Specificity} = \frac{TN}{TN + FP} \cdot 100\%$$

Where, TP, TN, FP, and FN denote true positive, true negative, false positive and false negative respectively.

Figure 7:
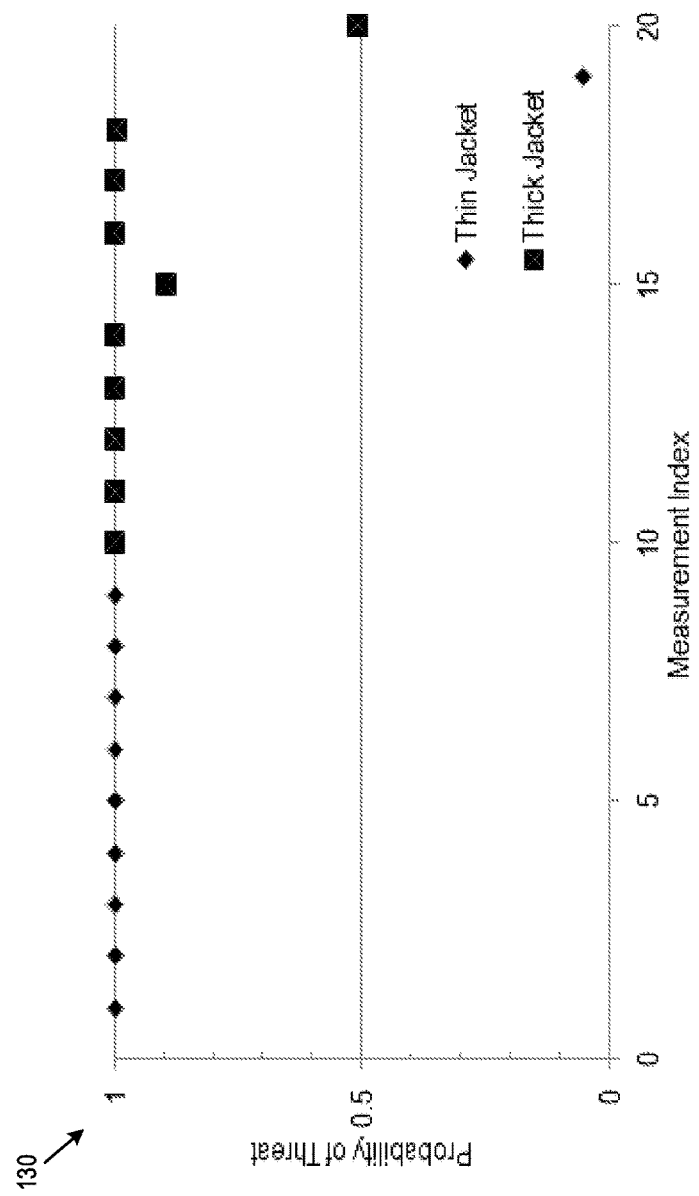
FIG. 7 shows a plot of target assessment results achieved using an example of a background removal process that is described herein.

Referring now to FIG. 7, shown therein is a plot 130 with probability of threat target assessment results obtained from an embodiment of system 10 employing the background removal techniques described herein. As seen in Table 3 all but one target is classified correctly in plot 130.

TABLE 3

| | Predicted Class | |
|---|---|---|
| Actual Class | Non-Threat (1) | Threat (2) |
| Non-Threat (1) | 1 | 1 |
| Threat (2) | 0 | 18 |

Figure 8:
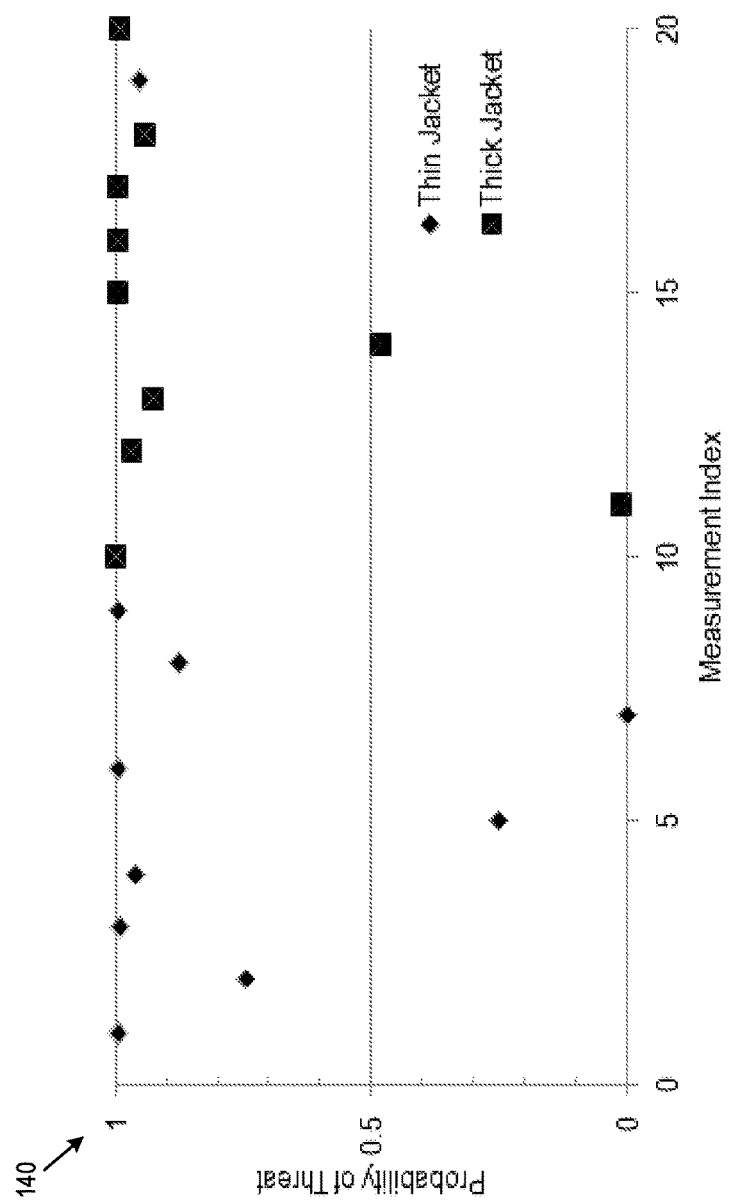
FIG. 8 shows a plot of target assessment results achieved without using a background removal process.

For comparison, FIG. 8 shows a plot 140 of the probability of threat target assessment results without background removal. As seen in Table 4, six measurements are incorrectly classified and four of the people with weapons were not identified in plot 140. The condition used to obtain the results shown in FIGS. 7 and 8 were the same as those used to obtain the results shown in Table 1, described above.

TABLE 4

| | Predicted Class | |
|---|---|---|
| Actual Class | Non-Threat (1) | Threat (2) |
| Non-Threat (1) | 0 | 2 |
| Threat (2) | 4 | 14 |

Results were also acquired using an embodiment of system 10 with faster, wideband pulse radiofrequency signal stream. Tables 5 and 6 show the target assessment results when 4 weapon types are being detected. In the embodiment shown in Table 5, the statistical model used is a classifier with 5 classes. The classifier assigns the scattered signal stream received from each target into a particular weapon class is used to identify the particular weapon, as seen in Table 5.

TABLE 5

| | Predicted Class | | | | |
|---|---|---|---|---|---|
| Actual Class | Non-Threat | Weapon 1 | Weapon 2 | Weapon 3 | Weapon 4 |
| Non-Threat | 16 | 0 | 3 | 2 | 3 |
| Weapon 1 | 0 | 0 | 5 | 5 | 8 |
| Weapon 2 | 2 | 1 | 4 | 3 | 8 |
| Weapon 3 | 0 | 1 | 6 | 3 | 2 |
| Weapon 4 | 3 | 0 | 2 | 0 | 7 |

The results from the same embodiments of system 10 can then be combined to determine a threat/non-threat target assessment. This is shown in Table 6, where a sensitivity of 91.6% and a specificity of 66.7% are achieved.

TABLE 6

| | Predicted Class | |
|---|---|---|
| Actual Class | Non-Threat (1) | Threat (2) |
| Non-Threat (1) | 16 | 8 |
| Threat (2) | 5 | 55 |

These results were obtained prior to implementing any adaptive aspects of the system 10. The adaptive features used in embodiments of system 10 are likely to improve these results as the system adapts to the environment in which it is deployed (see Table 2 above for example).

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without generally departing from the embodiments described herein.

The invention claimed is:

1. A method for detecting a weapon, the method comprising:
   emitting a radiofrequency signal stream into a region of interest;
   receiving a scattered signal stream from the region of interest, the scattered signal stream generated in the region of interest from the radiofrequency signal stream when a target is at least partially within the region of interest;
   identifying a late time response portion of the scattered signal stream and an early time response portion of the scattered signal stream;
   identifying a plurality of resonant signal components from the late time response portion of the scattered signal stream;
   generating a plurality of preprocessed resonant signal components by removing at least one signal component from the plurality of resonant signal components, the at least one signal component corresponding to stored resonant environmental signal components for the region of interest;
   determining a target assessment from the plurality of preprocessed resonant signal components and the early time response portion of the scattered signal stream using a statistical model that is based on resonant signals and early-time responses associated with the weapon, wherein the statistical model is generated using a training database having a first dataset with a first plurality of resonant signal components and early time responses associated with the weapon and a second dataset with a second plurality of resonant signal components and early time responses associated with a generic target when the weapon is not present on the generic target; and triggering a target response if the target assessment indicates the weapon is detected on the target.

2. The method as defined in claim 1, wherein the tate time response portion is identified by:
   identifying an initial reflection of the emitted radiofrequency stream in the scattered signal stream; and
   identifying the late time response portion based on the identified initial reflection.

3. The method as defined in claim 1, wherein the resonant environmental signal components for the region of interest are determined by:
   receiving a background scattered signal stream from the region of interest when no targets are within the region of interest;
   pre-processing the background scattered signal stream to identify a background early-time response portion and a background late-time response portions;
   identifying the resonant environmental signal components as a plurality of background resonant signal components from the background late-time response portion of the background scattered signal stream; and
   storing the resonant environmental signal components.

4. The method as defined in claim 1, wherein
the method further comprises:
   updating the second dataset based on the plurality of preprocessed resonant signals components and the identified early time response portion if the weapon is not detected on the target.

5. The method as defined in claim 1, wherein:
   the emitted radiofrequency signal stream is polarized to about a first orientation; and
   the scattered signal stream is received at about the first orientation and at about a second orientation, the second orientation being substantially orthogonal to the first orientation.

6. The method as defined in claim 5, wherein the emitted radiofrequency signal stream is sequentially polarized to about the first orientation and to about the second orientation.

7. The method as defined in claim 1, wherein the emitted radiofrequency signal stream has a frequency range of between about 0.5 GHz and about 5 GHz.

8. A system for detecting a weapon, the system comprising:
   a radiofrequency transmitter having at least one transmission antenna, the radiofrequency transmitter configured to emit a radiofrequency signal stream into a region of interest using the at least one transmission antenna;
   a radiofrequency receiver having at least one reception antenna, the radiofrequency receiver configured to receive a scattered signal stream from the region of interest using the at least one reception antenna, the scattered signal stream generated in the region of interest from the radiofrequency signal stream emitted by the radiofrequency transmitter when a target is at least partially within the region of interest;
   a data storage unit storing resonant environmental signal components for the region of interest, a training database having a first dataset with a first plurality of resonant signal components and early time responses associated with the weapon and a second dataset with a second plurality of resonant signal components and early time responses associated with a generic target when the weapon is not present on the generic target, and a statistical model based on resonant signals and early-time responses associated with the weapon, wherein the statistical model is generated using the training database; and
   a controller coupled to the radiofrequency transmitter, the radiofrequency receiver, and the data storage unit, the controller configured to:
      identify a late time response portion of the scattered signal stream and an early time response portion of the scattered signal stream;
      identify a plurality of resonant signal components from the late time response portion of the scattered signal streams;
      generate a plurality of preprocessed resonant signal components by removing at least one signal component from the plurality of resonant signal components, the at least one signal component corresponding to the stored resonant environmental signal components;
      determine a target assessment from the plurality of preprocessed resonant signal components and the early time response portion of the scattered signal stream using the statistical model; and
      trigger a target response if the target assessment indicates the weapon is detected on the target.

9. The system as defined in claim 8, wherein the controller is further configured to identify the late time response portion by:
   identifying an initial reflection of the emitted radiofrequency stream in the scattered signal stream; and
   identifying the late time response portion based on the identified initial reflection.

10. The system as defined in claim 8, wherein:
    the radiofrequency receiver is further configured to receive a background scattered signal stream from the region of interest when no targets are within the region of interest using the at least one reception antenna; and
    the controller is further configured to:
       preprocess the background scattered signal stream to identify a background early-time response portion and a background late-time response portion; and
       identify the resonant environmental signal components for the region of interest as a plurality of background resonant signal components from the background late-time response portion of the background scattered signal stream; and
       store the resonant environmental signal components in the data storage unit.

11. The system as defined in claim 8, wherein
the controller is configured to:
   update the second dataset and the statistical model based on the plurality of preprocessed resonant signal components and the identified early time response portion if the weapon is not detected on the target.

12. The system as defined in claim 8, wherein:
   the radiofrequency transmitter is configured to emit the radiofrequency signal stream polarized to about a first orientation using the at least one antenna;
   the at least one reception antenna includes a first reception antenna and a second reception antenna; and
   the radiofrequency receiver is configured to receive the scattered signal stream at about the first orientation using the first reception antenna and at about a second orientation using the second reception antenna, the second orientation being substantially orthogonal to the first orientation.

13. The system as defined in claim 12, wherein:
the radiofrequency transmitter is further configured to sequentially emit the radiofrequency signal stream polarized to about the first orientation and the radiofrequency signal stream polarized to about the about the second orientation.

14. The system as defined in claim 8, wherein the radiofrequency transmitter is configured to emit the radiofrequency signal stream with a frequency range of between about 0.5 GHz and about 5 GHz.

15. The system as defined in claim 8, wherein:
the radiofrequency transmitter is positioned at a first periphery region of the region of interest; and
the radiofrequency receiver is positioned at a second periphery region of the region of interest facing the radiofrequency transmitter, the second periphery region substantially opposite the first periphery region.

16. The system as defined in claim 8, wherein:
the radiofrequency transmitter is positioned at a first periphery region of the region of interest; and
the radiofrequency receiver is positioned substantially adjacent to the radiofrequency transmitter.

17. The system as defined in claim 8, further comprising:
a second radiofrequency transmitter spaced apart from the radiofrequency transmitter, the second radiofrequency transmitter having at least one additional transmission antenna and being configured to emit a second radiofrequency signal stream into the region of interest; and
a second radiofrequency receiver spaced apart from the radiofrequency receiver, the second radiofrequency receiver having at least one additional reception antenna and being configured to receive a second scattered signal stream from the region of interest when the target is at least partially within the region of interest, the second scattered signal stream generated in the region of interest from the second radiofrequency signal stream emitted by the second radiofrequency transmitter; and
wherein
the controller is coupled to the second radiofrequency transmitter and to the second radiofrequency receiver; and
the controller is further configured to:
identify a second plurality of resonant signal components from the second scattered signal stream;
generate a second plurality of preprocessed resonant signal components by removing a second at least one resonant environmental signal component for the region of interest from the second plurality of resonant signal components, the second at least one resonant environmental signal component corresponding to the stored resonant environmental signal components;
determine a second target assessment from the second plurality of preprocessed resonant signals using the statistical model; and
trigger the target response if the second target assessment indicates the weapon is detected on the target.

18. A non-transitory, computer-readable storage medium storing instructions executable by a processor coupled to the storage medium, the instructions for programming the processor to:
emit a radiofrequency signal stream into a region of interest using a radiofrequency transmitter;
receive a scattered signal stream from the region of interest using a radiofrequency receiver, the scattered signal stream generated in the region of interest from the radiofrequency signal stream when a target is at least partially within the region of interest;
identify a late time response portion of the scattered signal stream and an early time response portion of the scattered signal stream;
identify a plurality of resonant signal components from the late time response portion of the scattered signal stream;
generate a plurality of preprocessed resonant signal components by removing at least one signal component from the plurality of resonant signal components, the at least one signal component corresponding to stored resonant environmental signal components for the region of interest;
determine a target assessment from the plurality of preprocessed resonant signal components and the early time response portion of the scattered signal stream using a statistical model that is based on resonant signals and early-time responses associated with the weapon, wherein the statistical model is generated using a training database having a first dataset with a first plurality of resonant signal components and early time responses associated with the weapon and a second dataset with a second plurality of resonant signal components and early time responses associated with a generic target when the weapon is not present on the generic target; and
trigger a target response if the target assessment indicates the weapon is detected on the target.

* * * * *